(12) United States Patent
Sintov

(10) Patent No.: US 7,277,612 B2
(45) Date of Patent: Oct. 2, 2007

(54) OPTICAL APPARATUS INCLUDING PUMP GUIDING FIBER AND RECEIVING FIBER

(75) Inventor: Yoav Sintov, Petah Tikva (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 0 days.

(21) Appl. No.: 10/560,616

(22) PCT Filed: Jun. 14, 2004

(86) PCT No.: PCT/IL2004/000512

§ 371 (c)(1),
(2), (4) Date: Dec. 14, 2005

(87) PCT Pub. No.: WO2004/112206

PCT Pub. Date: Dec. 23, 2004

(65) Prior Publication Data

US 2006/0133731 A1   Jun. 22, 2006

(51) Int. Cl.
*G02B 6/26* (2006.01)
*G02B 6/42* (2006.01)

(52) U.S. Cl. .......................................... 385/43; 385/39

(58) Field of Classification Search ................ 385/39, 385/43

See application file for complete search history.

(56) References Cited

U.S. PATENT DOCUMENTS

| 5,864,644 A * | 1/1999 | DiGiovanni et al. .......... 385/43 |
| 5,937,134 A * | 8/1999 | DiGiovanni ................ 385/142 |
| 5,999,673 A * | 12/1999 | Valentin et al. ............... 385/43 |
| 6,370,297 B1 * | 4/2002 | Hakimi et al. ................ 385/27 |
| 7,046,432 B2 * | 5/2006 | Starodoumov ......... 359/341.32 |
| 2002/0106159 A1 * | 8/2002 | Nishimura et al. ............ 385/49 |

FOREIGN PATENT DOCUMENTS

| EP | 0320990 | 6/1989 |
| EP | 1065764 | 1/2001 |
| EP | 1065764 A2 * | 1/2001 |
| JP | 63094205 | 4/1988 |

* cited by examiner

Primary Examiner—Frank G. Font
Assistant Examiner—Derek L. Dupuis
(74) Attorney, Agent, or Firm—Dekel Patent Ltd.; David Klein

(57) ABSTRACT

Optical apparatus comprising a pump guiding fiber comprising a fiber cladding, a fiber core and an attachment section, the attachment section comprising a straight core section and a tapered core section, and a receiving fiber comprising an inner clad to which the attachment section is attached.

7 Claims, 3 Drawing Sheets

OPTICAL APPARATUS INCLUDING PUMP GUIDING FIBER AND RECEIVING FIBER

FIELD OF THE INVENTION

The present invention relates to side pumping of fiber lasers and amplifiers, such as high power fiber lasers and amplifiers.

BACKGROUND OF THE INVENTION

High power fiber lasers have become increasingly popular due to their high efficiency, simplicity and reliability. In addition, they may be easily ruggedized, due to their simple arrangement.

High power applications generally use a double clad fiber. This fiber comprises a core, usually doped with a lasing material such as rare earth ions or other, an inner cladding encircling the doped core, through which the pump power flows and is gradually absorbed in the doped core, and an outer cladding the inner cladding and forming a dielectric wave guide for the pump signal. The optical characteristics of the inner cladding closely match high power diode lasers, commonly used for solid-state laser pumping. Therefore, highly efficient pumping may be achieved by utilizing double clad fibers as a gain material.

One of the problems in double clad fibers, used for high power fiber laser applications, is the end pumping approach for injecting optical pump power. End pumping provides at most only two input ends for each fiber in the laser system, through which all the injected power enters the fiber. This physical limit constrains the number and type of pump sources that may be used to inject the optical power. In addition, when the double clad fiber is used as a power amplifier, end pumping prohibits simple injection of the signal to be amplified, and renders the coupling optics cumbersome and expensive.

Modern high power pumping techniques for commercial fiber lasers and amplifiers are usually based on end pumping by diode lasers. The common fibers used for fiber lasers applications are $Yb^{3+}$ doped silica with tunable output between 980 nm-1200 nm (pumped by either 915 nm or 980 nm diodes), $Er^{3+}$ doped silica for 1550 nm eye-safe and communication applications (pumped by either 980 nm or 1480 nm diodes), and $Yb^{3+}:Er^{3+}$ silica fibers used also for 1550 nm applications, but in the high power range, where the wide spread erbium doped fibers are not applicable. Other fiber lasers used mostly for 2 μm remote sensing and medical applications are $Tm^{3+}$ doped and $Ho^{3+}:Tm^{3+}$ doped silica fibers.

The most commonly used fiber for marking, drilling and other industrial applications is the $Yb^{3+}$ fiber, characterized by high efficiency and robustness. In addition, reliable and efficient pump diodes are available for this ion excitation, while its wide absorption band (25 nm) enables using pump diodes that do not need special cooling. The fiber's high efficiency and high surface-to-volume ratio enables cooling by air rather than cumbersome liquid cooling in solid-state lasers.

One of the main limitations today in using high power fiber lasers and amplifiers is, however, the pump coupling technique. Reference is now made to FIG. 1, which illustrates a prior art end coupling in a high power fiber amplifier. A high power diode 10 may pump optical power to a rare-earth doped double clad fiber 18 (e.g., $Yb^{3+}$ doped fiber), through coupling optics 12 and an end-fiber coupling section 14. A seeder 16, such as a 1.064 μm diode, may inject low power signals to coupling section 14. Coupling section 14 may be coated for anti-reflection at the pump wavelength and may have high reflection at the signal wavelength. The double clad fiber 18 may be connected to output coupling optics 20.

However, the end pumping technique may limit coupling efficiency, lower the fiber laser system robustness, due to the complex optics alignment and tight tolerances required, and also increase the system cost, due to the expensive optics used. The problem becomes even more severe when high power fiber amplification is required. The complex alignment and tight tolerances, along with the high power flux at the fiber input end, render this configuration complex, inefficient, expensive and very sensitive to environmental changes.

Solutions have been proposed to these problems in the prior art. For example, U.S. Pat. No. 5,999,673 to Samartsev et al. describes a coupling between a multi-mode optical fiber pigtail and a double-clad optical fiber, that is, a fiber that includes an inner (single-mode or multi-mode) core with a diameter of few microns, a first cladding (multi-mode), and a second cladding. Samartsev et al. attempt to transfer multi-mode light source power to an optical fiber along a non-coaxial direction.

The coupling in Samartsev et al. comprises a tapered circular pump-guiding multi-mode fiber between the double clad fiber's inner cladding and the pump source. The pump-guiding fiber is tapered and then fused to the double clad fiber's inner clad, where the fusion region contains substantially the whole tapered region of the pump-guiding fiber, and nothing else. However, the divergence angle of the pump-guiding fiber, αs, and that of the multi mode inner cladding part of the double clad fiber, αf, has to satisfy the following relation:

$$\alpha f = k \cdot \alpha s$$

wherein k is a constant greater than 1.

There is an interest in using pump guiding fibers satisfying $k \leq 1$, since these pump guiding fibers can deliver more power than pump guiding fibers satisfying the $k > 1$ condition, as in Samartsev et. al. Pump guiding fibers satisfying $k \leq 1$ have a higher numerical aperture than pump guiding fibers with $k > 1$, and therefore, low brightness pump diode light with higher power can be efficiently coupled to these fibers, whereas with pump guiding fibers satisfying $k > 1$, as in Samartsev et. al, the coupling efficiency is low.

Another disadvantage of Samartsev et al. is that when using fibers with $k \leq 1$, (that is, the divergence angles of the pump guiding fiber is higher or equal to that of the inner cladding of the double clad fiber) where the fusion region is only the tapered region of the pump-guiding fiber, than the pump coupling efficiency between the pump guiding fiber and the inner cladding of the double clad fiber is low and renders the Samartsev et al. method inefficient.

SUMMARY OF THE INVENTION

The present invention seeks to provide simple, efficient and low cost side-coupling apparatus between a pump source and an active double clad fiber, useful for side pumping of high power fiber lasers and amplifiers. The invention may comprise a direct side coupling, employing leaky guiding mode coupling from a pump guiding fiber to a receiving active fiber, which may be a fiber laser or an optical amplifier. The side coupling may comprise a tapered fiber, as is described more in detail hereinbelow. The invention may reduce size and alignment sensitivity, and facilitate high power pump injection into the active fiber. The coupling technique of the present invention is much more robust, less expensive, more efficient than traditional end pumping techniques and more efficient and scalable to high powers than prior art side coupling, such as that of Samartsev et al.

BRIEF DESCRIPTION OF THE DRAWINGS

The present invention is herein described, by way of example only, with reference to the accompanying figures, wherein.

DETAILED DESCRIPTION OF THE PREFERRED EMBODIMENT

Figure 1:
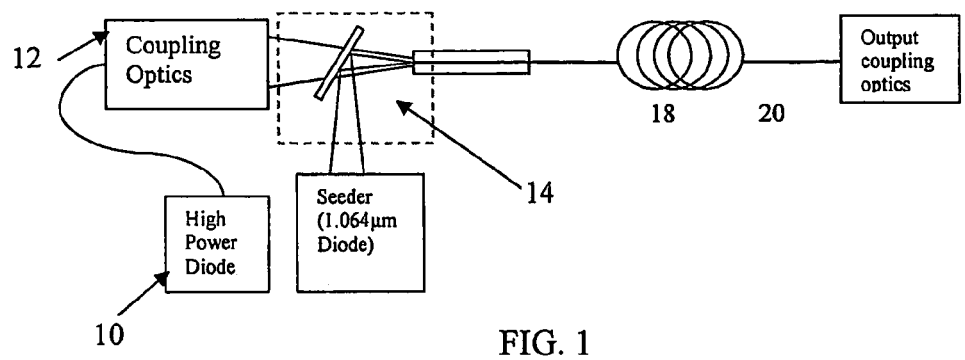
FIG. 1 is a simplified block diagram of a prior art end coupling in a high power fiber amplifier.
Figure 2:
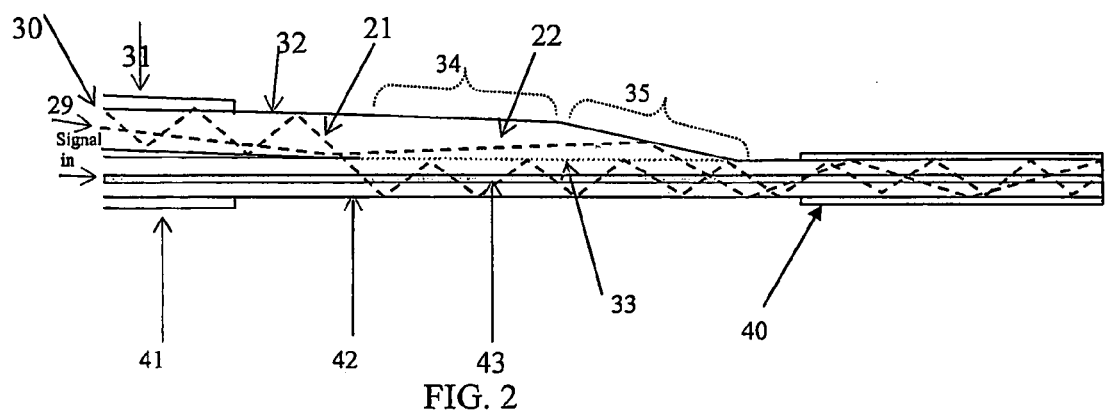
FIG. 2 is a simplified block diagram of a side coupling for a high power double clad fiber laser or amplifier, constructed and operative in accordance with an embodiment of the present invention.

Reference is now made to FIG. 2, which illustrates a side coupling for a fiber laser or optical amplifier, such as a high power double clad fiber laser or amplifier, constructed and operative in accordance with an embodiment of the present invention.

Figure 3:
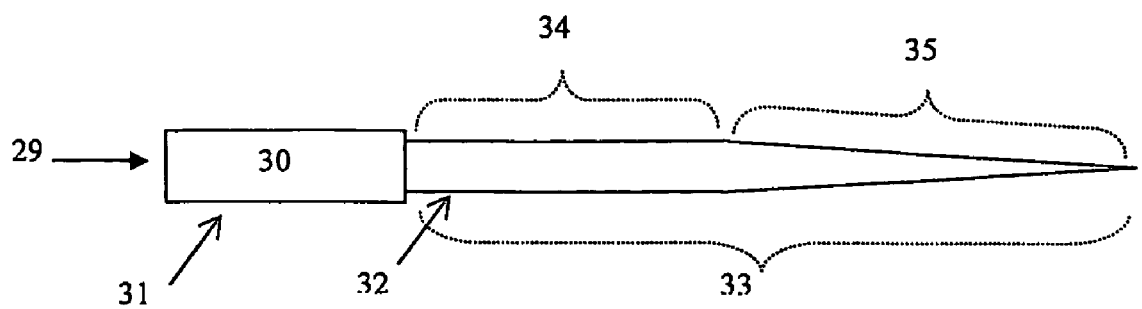
FIG. 3 is a simplified pictorial illustration of a tapered fiber used in the side coupling of FIG. 2, constructed and operative in accordance with an embodiment of the present invention.

A pump-guiding fiber 30 may comprise a fiber cladding 31, a fiber core 32 and an attachment section 33. As seen in FIG. 3, the fiber core 32 is exposed by stripping the fiber cladding 31 along the attachment section required 33. The attachment section 33 may comprise a straight core section 34 and a tapered core section 35. The ratio between the minimum cross section area of the tapered region and the initial cross section area thereof is from 0.01 to 0.5. The pump-guiding fiber 30 may be optically attached at one end thereof to a pump source 29, such as but not limited to, a semiconductor diode laser. The opposite end of pump-guiding fiber 30, which comprises the attachment section 33, may be attached to an inner clad 42 of a receiving (also referred to as an active or amplifying) fiber 40, which may be double clad. The attachment section 33 of the pump-guiding fiber 30 may be attached to the receiving fiber 40 in both the straight core section 34 and tapered core section 35 as illustrated in FIG. 2.

Figure 4:
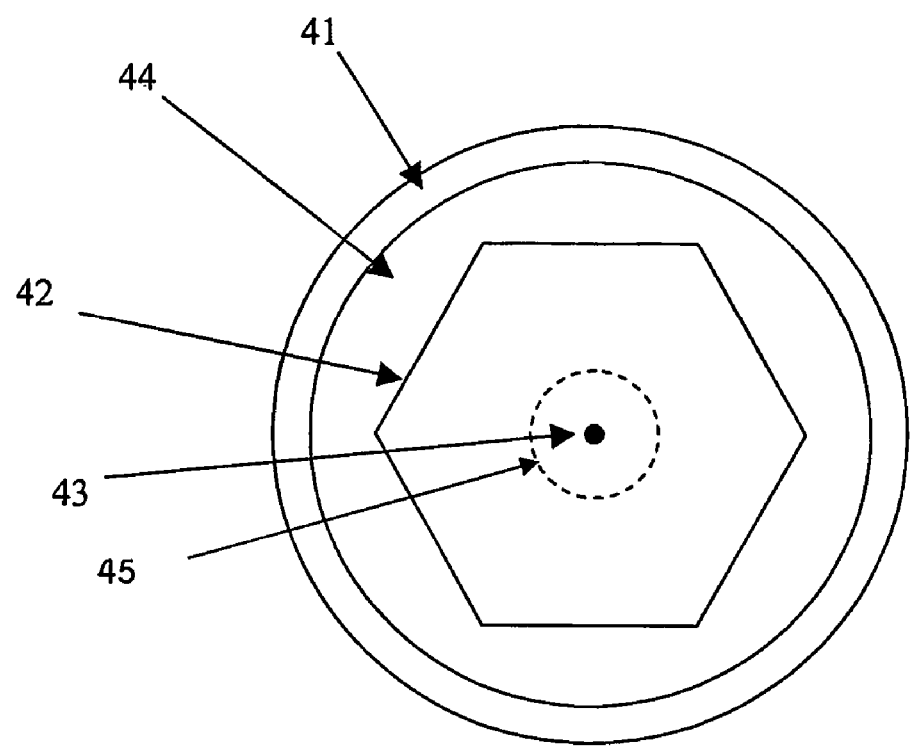
FIG. 4 is a simplified cross-sectional illustration of a hexagonal double clad fiber used in the side coupling of FIG. 2, in accordance with an embodiment of the present invention.

As seen in FIG. 4, the receiving fiber 40 may comprise, but not limited to, a protective outer jacket 41, an outer clad 44, inner clad 42 and a doped core 43, which may comprise a rare-earth doped core, such as but not limited to, $Yb^{3+}$ doped silica, $Er^{3+}$ doped silica, $Yb^{3+}:Er^{3+}$ doped silica, $Tm^{3+}$ doped silica and $Ho^{3+}:Tm^{3+}$ doped silica fibers. Additional clad layers 45 may be added between the doped core 43 and inner clad 42, creating a multiple clad fiber. The inner clad 42 of the receiving fiber 40 may be non-symmetrical, which may help to reduce or eliminate helical modes evolution, since these modes do not overlap with the doped core 43. The inner clad 42 may have a noncircular symmetry shape, such as but not limited to, a rectangular, D-shape, hexagonal (this example being illustrated in FIG. 4), or any other shape In the present invention, both the straight section 34 and the tapered section 35 of the pump-guiding fiber 30 attachment section 33 are attached to the double clad fiber 40 by various methods, such as but not limited to, fusing or gluing them together.

Reference is now made again to FIG. 2. The multi-mode pump light flowing in the pump-guiding fiber 30 is shared between high order modes 21 and low order modes 22 evolving in the pump-guiding fiber 30. The divergence angle of the light in the pump-guiding fiber 30 and the light acceptance angle of the multi mode inner cladding part 42 of the receiving fiber 40, αf, may satisfy the following relation:

$$\alpha f = k \cdot \alpha s$$

where k is a constant equal or smaller than 1.

When the pump light passes through the straight section 34 of the pump-guiding fiber 30, the high order modes 21, which are loosely confined to the pump-guiding fiber core 32, are efficiently matched to the receiving fiber 40 inner clad 42. After passing the straight section 34, the pump light arriving at the tapered section of the pump-guiding fiber 30 contains mainly the low order 22 modes, which are strongly confined to the pump-guiding fiber core 32. These modes are launched from the pump-guiding fiber 30 to the inner clad 42 of the receiving fiber 40 through the tapered attachment section. At the end of the attachment section 33, all of the pump light is matched into the receiving fiber 40 inner clad 42. The high order modes light 21, characterized by high divergence angles, with a maximum value of αs, is launched into the receiving fiber 40 inner clad 42, through the straight section 34, without changing its divergence angle, αs. These mode are trapped in the receiving fiber 40 inner clad 42, since the transversal attachment section 33 dimension is small compared to the receiving fiber 40 inner clad 42 perimeter. The low order modes light 22, characterized by low divergence angle, αs1<<αs, is launched into the receiving fiber 40 inner clad 42 through the tapered section 35, while increasing its divergence angle to values yet lower than αs, due to the tapered nature of the attachment section 35. It is preferable that the divergence angle of the high order modes 21, which is also the maximum divergence angle of the light flowing in the pump-guiding fiber 30, will be equal to αf, the acceptance angle of the receiving fiber 40 inner clad 42, namely, the constant k in the relation αf=k·αs is equal to 1. In this case both high order modes light 21 and low order modes light 22 are efficiently launched into the receiving fiber 40 inner clad 42 without leaking out of the receiving fiber 40 inner clad.

For example, in tests on an embodiment of the present invention, a coupling efficiency of up to 87% was achieved between a pre-tapered circular pump-guiding hard clad coated fiber 30 of 200 μm, NA=0.4 core, and a double clad fiber with 400 μm, NA=0.36 hexagonal shaped inner clad. The overall attachment length 33 was 50 mm with a straight section 34 length of 42 mm and a tapered section 35 of 8 mm.

Fibers attachment may be by gluing both fibers as illustrated in FIG. 2. It should be noted that when gluing is chosen as a preferred attachment method, the chosen glue refractive index should be closely identical to that of the two attached fibers.

Figure 5:
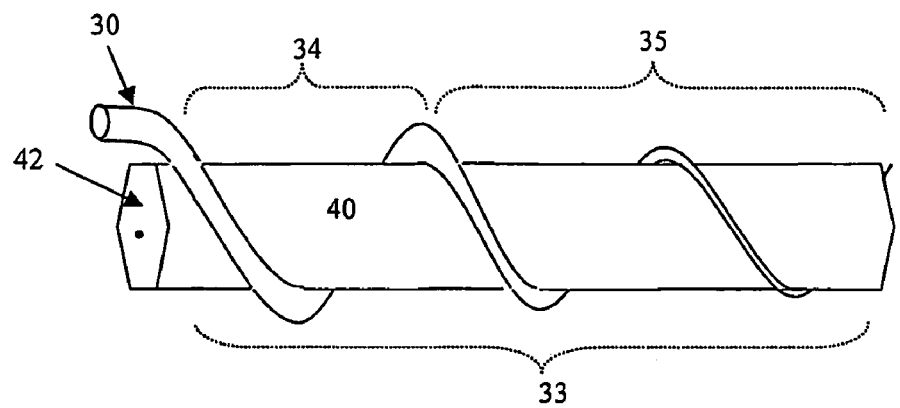
FIG. 5 is a simplified pictorial illustration of a twisted pre-tapered pump-guiding fiber core around the fed inner cladding of a double clad fiber, using fusion splicing to create a side coupler, in accordance with an embodiment of the present invention.

Another preferred method of attachment is shown in FIG. 5. In this method one may pre-taper the pump-guiding fiber 30 to the required straight 34 and tapered 35 sections lengths, and then twist the pump-guiding fiber 30 pre-tapered attachment section 33 around the receiving fiber's 40 inner clad 42. After twisting, both fibers may be fused, together in the attachment section 33 by generating sufficient melting heat around both twisted fiber 30 and the receiving fiber 40, and simultaneously pull both fibers slightly to create better contact between them during attachment.

Figure 6:
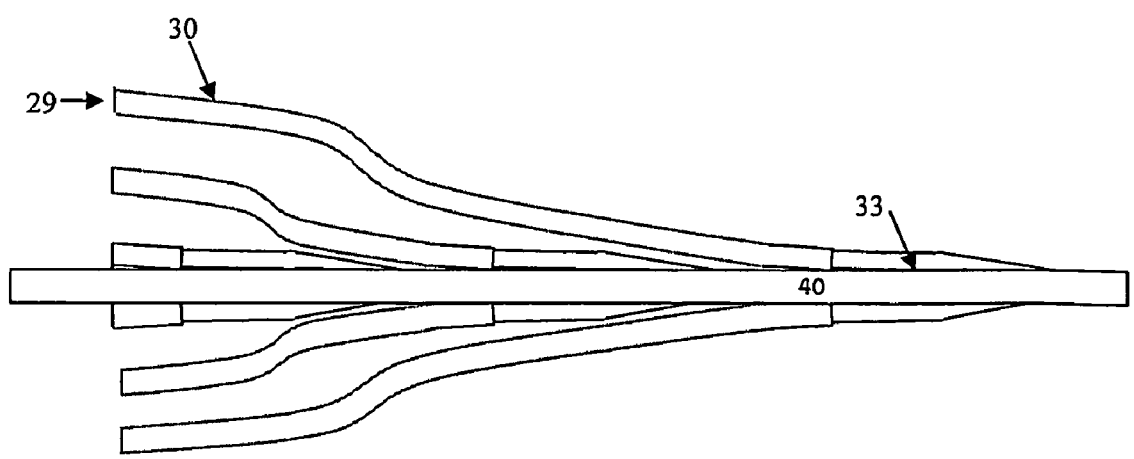
FIG. 6 is a simplified pictorial illustration of a plurality of tapered pump guiding fibers coupled to an inner cladding of a common double clad fiber, constructed and operative in accordance with an embodiment of the present invention.

Reference is now made to FIG. 6, which illustrates a plurality of tapered pump guiding fibers 30, constructed and operative in accordance with an embodiment of the present invention. The tapered pump fibers are attached to a common receiving fiber 40 in accordance with an embodiment of the present invention.

Each pump guiding fiber 30 may be individually optically connected at one end thereof to pump source 29, such as but not limited to, a single or multiple emitter semiconductor diode laser, whereas the attachment sections 33 of the pump guiding fibers 30 may be attached at different points along a single receiving fiber 40 for achieving high pump power coupling into that individual receiving fiber 40.

By injecting multiple pump signals to the active receiving fiber 40 at different locations along its length (through the multiple attachment sections 33 of the pump guiding fiber 30 and the active receiving fiber 40), high powers of up to several kilowatts may be achieved from the active receiving fiber 40.

It will be appreciated by person skilled in the art that the present invention is not limited by what has been particularly shown and described herein above. Rather the scope of the present invention is defined only by the claims that follow:

What is claimed is:

1. Optical apparatus comprising:
   a pump guiding fiber comprising a fiber cladding, a fiber core and an attachment section, said attachment section comprising a straight core section and a tapered core section; and
   a receiving fiber comprising an inner clad to which said straight core section and said tapered core section of said attachment section are attached, wherein a divergence angle of light in said pump guiding fiber αs, and a light acceptance angle of said inner clad of said receiving fiber, αf, satisfy the following relation:

$$\alpha f = k \cdot \alpha s$$

wherein k is a constant equal or smaller than 1, wherein said pump guiding fiber is attached to said receiving fiber only at said straight core section and said tapered core section, and wherein a length of said straight core section that is attached to said receiving fiber is at least as long as a length of said tapered core section that is attached to said receiving fiber.

2. Apparatus according to claim 1, wherein a ratio between a minimum cross section area of the tapered core section and said straight core section is in a range from 0.01 to 0.5.

3. Apparatus according to claim 1, wherein said pump guiding fiber is optically attached at one end thereof, opposite to said attachment section, to a pump source.

4. Apparatus according to claim 3, wherein said pump source comprises a semiconductor diode laser.

5. Apparatus according to claim 1, wherein said receiving fiber comprises a double clad fiber.

6. Apparatus according to claim 5, wherein said double clad fiber comprises a protective outer jacket, an outer clad, an inner clad and a doped core.

7. Apparatus according to claim 6, wherein said doped core comprises a rare-earth doped core.

* * * * *